Patented Apr. 11, 1939

2,153,553

UNITED STATES PATENT OFFICE 2,153,553

POLYMERIZATION OF OLEFINS

Eric William Fawcett, Reginald Oswald Gibson, and Michael Willcox Perrin, Northwich, England, assignors to Imperial Chemical Industries Limited, a corporation of Great Britain No Drawing. Application February 2, 1937, Serial No. 123,722. In Great Britain February 4, 1936

10 Claims. (Cl. 260—94)

This invention relates to polymerization processes, and more particularly to processes for polymerizing ethylene to semisolid and solid polymers and to the products obtained thereby.

It is already known that ethylene and its homologs can be polymerized to yield products ranging from relatively light up to fairly viscous oils by the use of elevated temperatures, e. g., 200 to 400° C., and of moderate super-atmospheric pressures, e. g., up to 200 atmospheres with or without the aid of catalysts.

An object of this invention is to provide a process for polymerizing ethylene to solid and semi-solid polymers. Another object is to produce solid polymers from ethylene which in compact form are characterized by being tough. A still further object is to produce technically useful solid polymers from ethylene.

The above and other objects appearing hereinafter are accomplished by subjecting ethylene to the action of pressures in excess of 500 atmospheres under controlled elevated temperature conditions, and separating the resulting polymer from the unconverted gas. If desired, the polymerization may be carried out in the presence or absence of solvents or diluents.

The reaction conditions in this invention comprise: the use of very high pressures, at least 500 atmospheres and preferably at least 1000 atmospheres; the use of moderate elevated temperatures between about 100 and 400° C., and preferably between about 150 and 250° C.; and careful control of the thermal conditions during the polymerization, in the sense that the heat of the reaction which is exothermic must be removed sufficiently rapidly to avoid an undue rise in temperature; the oxygen content, if any, of the initial material must not be allowed to exceed more than a very small critical amount.

Unless these four conditions are properly correlated, either no reaction will take place, on the one hand, or an undesired alternative reaction (which proceeds with explosive violence to give carbon and methane) will take place, on the other hand. With properly chosen conditions, however, the required polymerization is effected with good yields of polymers, and the nature thereof can be predetermined.

The question of the correct selection of the reaction conditions may best be approached by considering the probable nature of the reaction. The results of a series of experiments carried out under various conditions show that polymerization may take place in either or both of two ways: (1) a relatively slow reaction, which may proceed over a number of hours, at the end of which time a large proportion (e. g. up to 90%) of the ethylene has been converted; (2) a very rapid reaction, occurring for a few seconds only, which converts a relatively small percentage (e. g. 5–20%) to the polymer. The second mentioned method for obtaining the new polymers claimed herein is the subject matter of application Serial Number 157,810 filed August 6, 1937 by M. W. Perrin, J. G. Paton and E. G. Williams. Both types of reaction require an elevated temperature and pressure, and in both cases removal of the heat of reaction at a sufficient rate to prevent the temperature rising to too high a value is necessary. The second type of reaction appears, however, to require the presence of a certain quantity of oxygen and in the absence of oxygen, or in the presence of too little oxygen, does not take place, at any rate to any appreciable extent. The percentage of ethylene polymerized in this very rapid reaction, at a given temperature and pressure and under given thermal conditions, increases with increasing oxygen content until the latter reaches a certain limiting value for any set of experimental conditions. If more than the critical amount of oxygen is present the temperature rises locally in the gas so high that it exceeds the critical temperature above which explosive decomposition of the ethylene takes place.

The oxygen present, which initiates this very rapid reaction, is used up during the course of it and is attached chemically to the ethylene polymer; the remaining oxygen-free ethylene may then polymerize by the first mentioned slow, steady, reaction. This second type of reaction conducted in the presence of oxygen, however, is not claimed specifically herein since it is the subject matter of application Serial Number 157,810 filed August 6, 1937 by M. W. Perrin, J. G. Paton, and E. G. Williams.

With both types of reaction, the general effect of increasing the pressure is to increase the molecular weight of the product, also to accelerate the reaction; increasing the temperature will accelerate the reaction, but tends to give a product of lower molecular weight. Hence, for a given oxygen content, high pressure/low temperature conditions (within the operative range) give products of high molecular weight, and low pressure/high temperature conditions products of relatively low molecular weight. Increasing the oxygen content (within the allowable limits), apart from its specific effect on the reaction, also influences the molecular weight of the product, in the direction of lowering the same. It is understood that whatever the temperature-pressure-oxygen content conditions chosen, the heat of the reaction must in all cases be suitably dissipated to prevent the temperature from exceeding the value at which, instead of polymerization, the alternative explosive decomposition reaction occurs. It is difficult to define the critical temperature accurately, because in turn it is dependent upon the other reaction conditions, but employing 1500 atmospheres, 200° C. and 0.1% of oxygen, it appears that the temperature must not be allowed to exceed about 400° C., and if higher pressures are employed, then this temperature must be lower.

It is possible to carry out the polymerization reaction in practice under such conditions that both types of reaction will occur, which is equivalent to obtaining rapid polymerization to a certain extent, followed by slow polymerization to bring up the yield to the desired figure. We prefer to employ between about 0.03% and 5% of oxygen with the initial ethylene and, under typical conditions of pressure and temperature (about 1500 atmospheres and 190°–210° C.), about 0.06% of oxygen is suitable. Suitable measures to achieve rapid removal of the heat of reaction are: the use of diluents for the ethylene (e. g. the use of industrial gases containing olefins, such as cracking still gases); the use of a reaction vessel constructed of, or lined with, a metal or alloy of high thermal conductivity; the initiation of the reaction by means of an internal heating element of small heat capacity spaced within a cold-walled reaction vessel; efficient stirring of the system during reaction either mechanically or by inducing turbulent flow. Naturally, combinations of these and the use of other suitable heat dissipation measures may be adopted.

The process described herein may be advantageously operated as a continuous process for the production of solid or semi-solid polymers of ethylene, in which the initial material contains a relatively small content of oxygen and is compressed and heated (e. g. by passage over a heated surface or through a heated reaction space) to effect polymerization, the oxygen content being at the same time used up; the resulting polymer is separated from the unconverted ethylene and the latter is recycled along with fresh ethylene and oxygen for a further polymerization.

The physical properties of the reaction products obtained depend upon the pressure at which the polymerization is effected; for example, polymers obtained employing pressures above 1000 atmospheres are solids which in compact form are tough and waxy like paraffin wax in feel, while polymers obtained using pressures below 1000 atmospheres, e. g., 500 atmospheres, are hydrocarbon greases. The physical properties of these greases, however, may be modified by subjecting them to distillation in a short path still, e. g., a still in which the distilling and condensing surfaces are usually 1 to 5 centimeters apart, under a vacuum of the order of $10^{-2}$ to $10^{-6}$ millimeters of mercury.

The physical state of the products obtained in accordance with the invention is also dependent upon the conditions employed in their recovery from the unconverted ethylene; thus, if the product is allowed to cool under substantially the polymerization pressure it is found as a finely divided white powder of low packing density, while if the pressure is released while the product is still at substantially the reaction temperature it is found as a tough solid which softens at temperatures up to about 120° C., the particular temperature depending upon the pressure conditions employed.

The following examples are submitted to illustrate and not to limit this invention:

Example I

Ethylene was compressed into a steel bomb of 2.5 cms. internal diameter and of 75 cc. capacity to a total pressure of 2000 atmospheres. The bomb was maintained in a constant temperature bath for about 4 hours at 170° C., after which time it was withdrawn from the bath, the pressure released, and the product allowed to cool to room temperature. The product obtained was a tough opaque, thermoplastic solid of negligible vapor pressure, and melted at about 120° C. to a clear, viscous liquid.

The polymer produced as above described is negligibly soluble at room temperatures in such organic solvents as benzene, toluene, xylene, petroleum ether, tetrahydronaphthalene, carbon tetrachloride, trichlorethylene, amyl acetate, etc.; its solubility in these solvents, however, increases with the temperature, the increase being particularly rapid at 60 to 80° C. The polymers are, for instance, soluble in xylene at its boiling point.

Water, ethanol, amyl alcohol, ethyl ether, acetone, chloroform, and glycerin are non-solvents for the polymer even up to their boiling points. The polymer is incompatible with such drying oils as linseed, and with nitrocellulose.

An outstanding property of the polymers of this invention, which are essentially saturated products corresponding in composition substantially to $(CH_2)_x$, is their chemical inertness, as shown by the fact that they are unaffected by contact with inorganic acids and alkalis either in the cold or at 80 to 90° C. These polymers show a crystalline structure when subjected to X-ray diffraction analysis.

Example I was repeated, except that the pressure was not released until after cooling to room temperature. The product obtained under these conditions was a white, finely divided solid of low packing density.

Example II

This example is designed to show the difference between the two types of polymerization reaction, proceeding in the absence and the presence of oxygen respectively.

Ethylene, from which oxygen has been carefully removed, is compressed in a steel bomb to a pressure of 1500 atms. The bomb is maintained in a constant temperature bath of 2¾ hours at a temperature of 230° C. and during the course of the reaction the contents of the bomb are stirred by a suitable mechanical arrangement. At the end of the reaction time 50% of the ethylene has been polymerized and during the course of the reaction the pressure has fallen to 1000 atmospheres.

Ethylene, containing 0.08% of oxygen, is compressed in a similar apparatus to a pressure of 1500 atmospheres. The temperature of the bomb is then raised to 200° C., when a very rapid reaction takes place, shown by a sudden fall in pressure of 150 atmospheres. The bomb was opened and as a result of this initial rapid reaction 15% of the ethylene was found to have been polymerized. The unconverted ethylene contained no measurable quantity of oxygen.

Example III

Ethylene containing 0.05% oxygen was compressed into the bomb described in Example I to a total pressure of 1500 atmospheres and heated rapidly to 210° C. whereupon a sudden "kick" on the pressure gauge was observed followed by a slow drop in pressure. After 5 hours' heating at 210° C., the pressure was released, and the product allowed to cool to room temperature. Under these conditions an 80% yield of polymer, based on the ethylene used, was obtained. The properties of the product are substantially the same as those of the product of Example I.

The above experiment was repeated, except that the oxygen concentration in the ethylene was reduced to below 0.005%. Under these conditions no "kick" on the gauge was observed, the polymerization occurring slowly and smoothly giving after 5 hours an 80% yield of polymer.

*Example IV*

This example illustrates the polymerization of ethylene by a continuous process in which use is made of the rapid reaction, initiated by oxygen, only.

Ethylene, containing 0.06% of oxygen, is compressed to 1500 atmospheres and forced, at this pressure, through a steel reaction vessel containing an internal heating element at a temperature of 230° C. The walls of the main reaction vessel are kept below 100° C. by means of a water jacket. After passing through the reaction space the ethylene and the polymer which is formed are released through a suitable valve. In this experiment 10% of the ethylene passing through the vessel is converted to a polymer of molecular weight 8,000.

The process of this invention is operable at pressures within the range of from about 500 to about 3000 atmospheres at temperatures from about 100° C. to about 400° C. Generally, however, the higher the pressure employed the lower the temperature at which reasonable conversion to polymer occurs and vice versa. Generally, also, the higher the pressure the higher the molecular weight of the resulting polymer. This fact is shown in the table below which is a summary of a series of experiments carried out at pressures ranging from 500 to 3000 atmospheres and at 190° C.

| Pressures in atmospheres | Mean molecular weights |
| --- | --- |
| 500 | 2,000 |
| 1500 | 6,000–12,000 |
| 3000 | 12,000–24,000 |

The molecular weight of the polymer appears to be relatively independent of the temperature at which polymerization is effected. This is shown in the table below which is a summary of a series of experiments carried out at 1500 atmospheres and at temperatures varying from 166° C. to 218° C.

| Temperature, °C. | Mean molecular weight |
| --- | --- |
| 166 | 10,750 |
| 176 | 12,200–10,600 |
| 197 | 12,200–11,310 |
| 208 | 10,750 |
| 218 | 12,360 |

The above molecular weights were determined by measuring the viscosity of dilute solutions in tetrahydronaphthalene at 75° C. in accordance with the method described by Staudinger in Zeitsch. Phys. Chem. 129, 171 (1934). The values given in the above tables are to be taken only as relative but probably of the right order of magnitude.

The presence of small but carefully determined amounts of oxygen (or of a substance which under the reacting conditions liberates oxygen) in the ethylene is desirable to help initiate the reaction. The oxygen content in any case, however, should not exceed 5% of the ethylene, but the optimum amount in any case depends upon the reaction conditions, i. e., the pressure, temperature, and rapidity of dissipation of the heat of reaction.

By virtue of the very low vapor pressure of these ethylene polymers, even at their softening point, they lend themselves admirably for use in the sealing of joints in vacuum equipment. For example, the polymer obtained by polymerizing ethylene at 1500 atmospheres and 190° C. is remarkably heat-stable and has a negligible vapor pressure up to about 300° C. This polymer may be used to lubricate the seal of vacuum joints maintained at above the softening point of the polymer. The seal once made is effective not only at elevated temperatures but also at low temperatures, e. g., that of liquid nitrogen. Further, the seal may be repeatedly heated and cooled without breaking the vacuum.

The polymers of this invention are also useful in the impregnation of textiles, paper, leather, etc.; as adhesives in the preparation of safety-glass and other laminated articles; as protective coatings for metals, stone, shotgun shells, etc.; as bullet lubricants, etc.; in the sealing of carboys and acid bottles, etc.; in the preparation of shoe and furniture polishes, etc.

From a consideration of the above specification, it will be appreciated that many improvements and modifications in the details may be made without departing from the spirit and scope of the invention. It is to be understood, therefore, that the invention is in no way limited, except as defined by the appended claims.

We claim:

1. A process for producing polymers from ethylene which comprises subjecting ethylene to a pressure above about 500 atmospheres and a temperature above about 100° C.

2. A process for producing polymers from ethylene which comprises subjecting ethylene to a pressure from about 500 to about 3000 atmospheres and a temperature from about 100° C. to about 400° C. under conditions providing for the continuous removal of the heat of reaction.

3. In the process for producing solid, tough polymers from ethylene, the steps which comprise subjecting ethylene to a pressure from about 500 to about 3000 atmospheres at a temperature from about 100° C. to about 400° C. under conditions providing for the continuous removal of the heat of reaction, and then releasing the pressure at the reaction temperature.

4. A process for producing a solid, tough polymer from ethylene which comprises subjecting ethylene to a pressure of about 2000 atmospheres at a temperature of about 170° C. for about 4 hours, and then releasing the pressure at the reaction temperature.

5. A process for producing solid polymers from ethylene which comprises subjecting ethylene to a pressure of at least 1000 atmospheres and a temperature from about 100° C. to about 400° C., under conditions providing for the continuous removal of the heat of reaction.

6. A polymer from ethylene which is a solid at normal temperatures, which corresponds in composition substantially to $(CH_2)_x$, and which by X-ray diffraction analysis shows a crystalline structure.

7. A polymer from ethylene which is a tough solid at normal temperatures, has a melting point from about 100° C. to about 120° C., corresponds in composition substantially to $(CH_2)_x$, and has a molecular weight of at least 6,000.

8. A polymer from ethylene which is a tough solid at normal temperatures, is waxy in feel like paraffin wax, is negligibly soluble in xylene at normal temperatures but soluble in xylene at its boiling point, corresponds in composition substantially to $(CH_2)_x$, and has a molecular weight of at least 6,000.

9. A process for producing polymers from ethylene which comprises subjecting ethylene to a pressure of at least 1000 atmospheres and a temperature from about 100° C. to about 400° C.

10. A process for producing polymers from ethylene which comprises subjecting ethylene to a pressure of at least 1000 atmospheres and a temperature from about 150° C. to about 250° C.

ERIC WILLIAM FAWCETT.
REGINALD OSWALD GIBSON.
MICHAEL WILLCOX PERRIN.